United States Patent
Rich et al.

(10) Patent No.: US 8,798,273 B2
(45) Date of Patent: Aug. 5, 2014

(54) EXTENDING CREDENTIAL TYPE TO GROUP KEY MANAGEMENT INTEROPERABILITY PROTOCOL (KMIP) CLIENTS

(75) Inventors: Bruce Arland Rich, Cedar Park, TX (US); John Thomas Peck, Liberty Hill, TX (US); Gordon Kent Arnold, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 13/213,161

(22) Filed: Aug. 19, 2011

(65) Prior Publication Data

US 2013/0044878 A1 Feb. 21, 2013

(51) Int. Cl.
G06F 21/30 (2013.01)
G06F 21/00 (2013.01)
H04L 29/06 (2006.01)
H04L 9/08 (2006.01)

(52) U.S. Cl.
CPC ............. *H04L 9/083* (2013.01); *H04L 63/062* (2013.01); *H04L 63/0823* (2013.01)
USPC ........... 380/277; 380/278; 380/279; 713/155; 713/156; 726/5; 726/6

(58) Field of Classification Search
USPC ................. 380/277, 278, 279; 713/155, 156; 726/5, 6
See application file for complete search history.

(56) References Cited

U.S. PATENT DOCUMENTS

| | | | |
|---|---|---|---|
| 6,330,562 B1 | 12/2001 | Boden et al. | |
| 7,290,288 B2 | 10/2007 | Gregg et al. | |
| 7,581,096 B2 | 8/2009 | Balfanz et al. | |
| 7,814,538 B2 | 10/2010 | Kuehnel et al. | |
| 7,849,495 B1 | 12/2010 | Huang et al. | |
| 8,401,468 B2 * | 3/2013 | Helvick | 455/41.1 |
| 2002/0144144 A1 | 10/2002 | Weiss et al. | |
| 2005/0129240 A1 | 6/2005 | Balfanz et al. | |
| 2005/0289085 A1 | 12/2005 | Hamber | |
| 2006/0294366 A1 | 12/2006 | Nadalin et al. | |
| 2007/0076889 A1 * | 4/2007 | DeRobertis et al. | 380/279 |
| 2008/0083026 A1 | 4/2008 | Sent | |
| 2009/0300356 A1 * | 12/2009 | Crandell | 713/170 |

(Continued)

FOREIGN PATENT DOCUMENTS

| | | |
|---|---|---|
| WO | WO 2008/000721 | 1/2008 |
| WO | WO 2010/063091 | 6/2010 |

OTHER PUBLICATIONS

GSAKMP: Group Secure Association Key Management Protocol. H. Harney, U. Meth, A. Colegrove, G. Gross. Jun. 2006.*
"Key Management Interoperability Protocol (KMIP)", OASIS, May 20, 2009.

(Continued)

*Primary Examiner* — William Powers
(74) *Attorney, Agent, or Firm* — Jeffrey S. LaBaw; David H. Judson

(57) ABSTRACT

A key management protocol (such as KMIP) is extended to provide an extended credential type to pass information from clients to the server to enable the server to deduce pre-provisioned cryptographic materials for the individual clients. Preferably, KMIP client code communicates device information to a key management server in a value in the headers of KMIP requests that flow to the server. In this manner, KMIP requests are associated with pre-provisioned cryptographic materials for particular devices or device groups.

25 Claims, 8 Drawing Sheets

(56) References Cited

U.S. PATENT DOCUMENTS

2009/0300744 A1    12/2009  Guo et al.
2010/0232607 A1*    9/2010  Nimura et al. ............... 380/279
2011/0016509 A1     1/2011  Huang et al.
2012/0210136 A1*    8/2012  Haddad et al. ............... 713/176

OTHER PUBLICATIONS

Osuna et al, "IBM System Storage Open Systems Tape Encryption Solutions," IBM Redbooks, Dec. 2010.
"IBM Tivoli Key Lifecycle Manager" Data Sheet, Sep. 2010.
"Tivoli Key Lifecycle Manager Version 2 Release 0 Installation and Configuration Guide," Aug. 2010.

* cited by examiner

500

HEADER: 502
- PROTOCOL VERSION
- MAXIMUM RESPONSE SIZE (OPTIONAL, IN REQUEST)
- TIME STAMP (OPTIONAL IN REQUEST, REQUIRED IN RESPONSE)
- AUTHENTICATION (OPTIONAL)
- ASYNCHRONOUS INDICATOR (OPTIONAL, IN REQUEST, NO SUPPORT FOR ASYNCHRONOUS RESPONSE IS DEFAULT)
- ASYNCHRONOUS CORRELATION VALUE (OPTIONAL, IN RESPONSE). USED LATER ON FOR ASYNCHRONOUS POLLING
- RESULT STATUS: SUCCESS, PENDING, UNDONE, FAILURE (REQUIRED, IN RESPONSE)
- RESULT REASON (REQUIRED IN RESPONSE IF FAILURE, OPTIONAL OTHERWISE)
- RESULT MESSAGE (OPTIONAL, IN RESPONSE)
- BATCH ORDER OPTION (OPTIONAL, IN REQUEST, IN-ORDER PROCESSING IS DEFAULT). SUPPORT AT SERVER IS OPTIONAL
- BATCH ERROR CONTINUATION OPTION: UNDO, STOP, CONTINUE. STOP (OPTIONAL, IN REQUEST, STOP IS DEFAULT). SUPPORT AT SERVER IS OPTIONAL
- BATCH COUNT

BATCH ITEM: 504
- OPERATION (ENUMERATION)
- UNIQUE MESSAGE ID (REQUIRED IF MORE THAN ONE BATCH ITEM IN MESSAGE)
- PAYLOAD (THE ACTUAL OPERATION REQUEST OR RESPONSE)
- MESSAGE EXTENSION (OPTIONAL, FOR VENDOR-SPECIFIC EXTENSIONS)

*FIG. 5*

- #define TAG_DEVICE_METADATA                0x540001
- #define TAG_DEVICE_METADATA_VERSION        0x540002
- #define TAG_DEVICE_METADATA_SERIAL_NUMBER  0x540003   ← 700
- #define TAG_DEVICE_METADATA_DEVICE_GROUP   0x540004
- #define TAG_DEVICE_METADATA_DEVICE_TEXT    0x540005
- #define TAG_DEVICE_METADATA_MACHINE_ID     0x540006
- #define TAG_DEVICE_METADATA_MEDIA_ID       0x540007
- #define TAG_DEVICE_METADATA_WORLDWIDE_NAME 0x540008
- #define TAG_DEVICE_METADATA_MACHINE_TEXT   0x540009

EXTENDING CREDENTIAL TYPE TO GROUP KEY MANAGEMENT INTEROPERABILITY PROTOCOL (KMIP) CLIENTS

CROSS-REFERENCE TO RELATED APPLICATION

This application is related to Ser. No. 13/213,191, filed Aug. 19, 2011, which application is commonly-owned and is titled "Enhancing Provisioning for Keygroups Using Key Management Interoperability Protocol (KMIP)."

BACKGROUND OF THE INVENTION

1. Technical Field

This disclosure relates generally to cryptographic key life-cycle management.

2. Background of the Related Art

Business data is growing at exponential rates, and along with that growth is a demand for securing that data. Enterprises have responded by implementing encryption at various layers, such as in hardware, on the network, and in various applications. This response has resulted in a series of encryption silos, some of which hold confidential customer data, with fragmented approaches to security, keys and coverage. Further, different applications across the enterprise often employ different encryption methods. Thus, for example, some departments in the organization may use public-key cryptography while others use secret-key or hashes. Still others do not encrypt data while it is at rest (such as when it is stored on a device or in a database) but only when the data is in motion, using virtual private networks (VPNs) to secure the data pipeline. Key management for these encryption approaches is often similarly fragmented. Sometimes key management is carried out by department teams using manual processes or embedded encryption tools. Other times, the key management function is centrally managed and executed. In some cases, no formal key management process is in place. This fragmented approach to key management can leave the door open for loss or breach of sensitive data.

Key Management Interoperability Protocol (KMIP) is a new standard for key management sponsored by the Organization for the Advancement of Structured Information Standards (OASIS). It is designed as a comprehensive protocol for communication between enterprise key management servers and cryptographic clients (e.g., from a simple automated device to a sophisticated data storage system). By consolidating key management in a single key management system that is KMIP-compliant, an enterprise can reduce its operational and infrastructure costs while ensuring appropriate operational controls and governance of security policy.

There is a challenge, however, in implementing KMIP with existing key management server architecture that is based on a centralized model, namely, one wherein clients are largely pre-provisioned with all of the cryptographic materials that they might need. This centralized model of this type accommodates a device-oriented support paradigm wherein the devices are sophisticated (e.g., storage devices) and have administrators responsible for their administration and management. KMIP, on the other hand, treats cryptographic clients uniformly and, more importantly, as entities that are intelligent and themselves capable of specifying cryptographic information, such as correct key sizes, encryption algorithms, and the like. The KMIP view of cryptographic clients is inconsistent with typical storage device types that today interact with enterprise key management servers. Indeed, such storage devices typically are better served with pre-provisioning support. As a consequence, there is an incompatibility between, on the one hand, the ability of existing key management servers to set up cryptographic attributes ahead of time, and, on the other hand, KMIP's theoretical support of otherwise highly-capable cryptographic clients that need no such pre-provisioning.

Although KMIP was designed to allow multiple-client authentication and authorization schemes, the only mechanisms defined in the first version of the protocol are UID (user identifier) and password, and client-side certificates. A key management server, however, needs to know more about the identity of its clients to be able to group them into device types and device groups and thus match them with pre-provisioned materials that befit their needs.

The subject matter of this disclosure addresses this need.

BRIEF SUMMARY

According to this disclosure, a key management protocol (such as KMIP) is extended to provide an extended credential type to pass information from clients to the server to enable the server to deduce pre-provisioned cryptographic materials for the individual clients. Preferably, KMIP client code communicates device information to a key management server in a value in the headers of KMIP requests that flow to the server. In this manner, KMIP requests are associated with pre-provisioned cryptographic materials for particular devices or device groups.

According to an embodiment, when a particular client device makes a request to a key management server, a request header includes a credential value that is a concatenated string of data that includes a device identifier (e.g., a serial number), and a device group. The body of the request includes at least one operation that is intended to be carried out at the server under the authorization of the credential provided. Based on the credential value (and the information encoded therein), the key management server computes a relationship between the device serial number and a device group. The key management server may also store the device serial number and associates it with a device group. This enables the key management server to connect the request to appropriate pre-provisioned cryptographic materials for particular devices or device groups.

According to another embodiment, a key management server-side method of processing device type information in a client-side certificate authentication process begins upon receiving a client request for key material. The key material typically identifies a device type. Preferably, a plurality of devices having a same device type typically share a pool of the key material. The client request includes a client-side certificate and a custom credential distinct from the certificate. The client-side certificate is used to authenticate the client, and the custom credential is used to identify the client and to determine whether key material for the client has been provisioned. If, and based on the determination, the client has been identified and the key material for the client has been provisioned, the key material is then served according to a key management protocol. If, however, the custom credential fails to identify the client, or if the key material has not been provisioned, a given action is taken. The given action may be refusing the client request, placing the client request in a queue for administrator review, or the like.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 5 illustrates a KMIP message format;

DETAILED DESCRIPTION OF AN ILLUSTRATIVE EMBODIMENT

Figure 1:
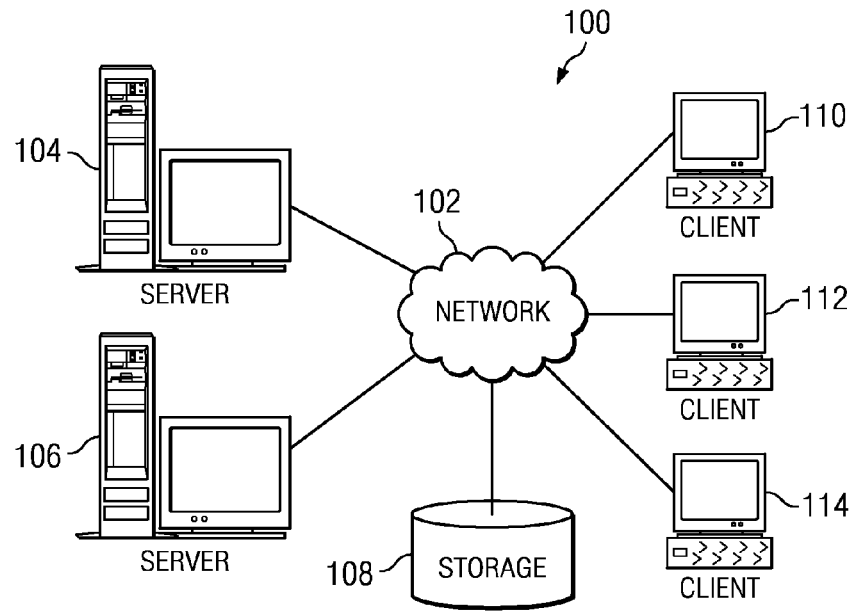
FIG. 1 depicts an exemplary block diagram of a distributed data processing environment in which exemplary aspects of the illustrative embodiments may be implemented.
Figure 2:
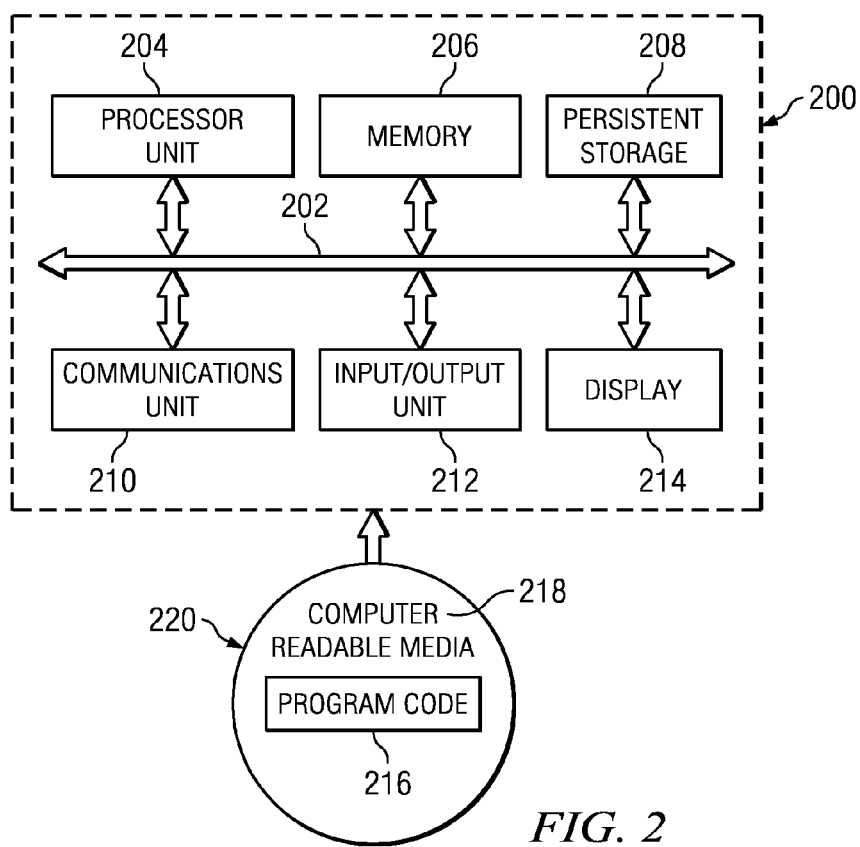
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides to the clients data, such as boot files, operating system images, and applications. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Key Management Interoperability Protocol (KMIP)

Figure 3:
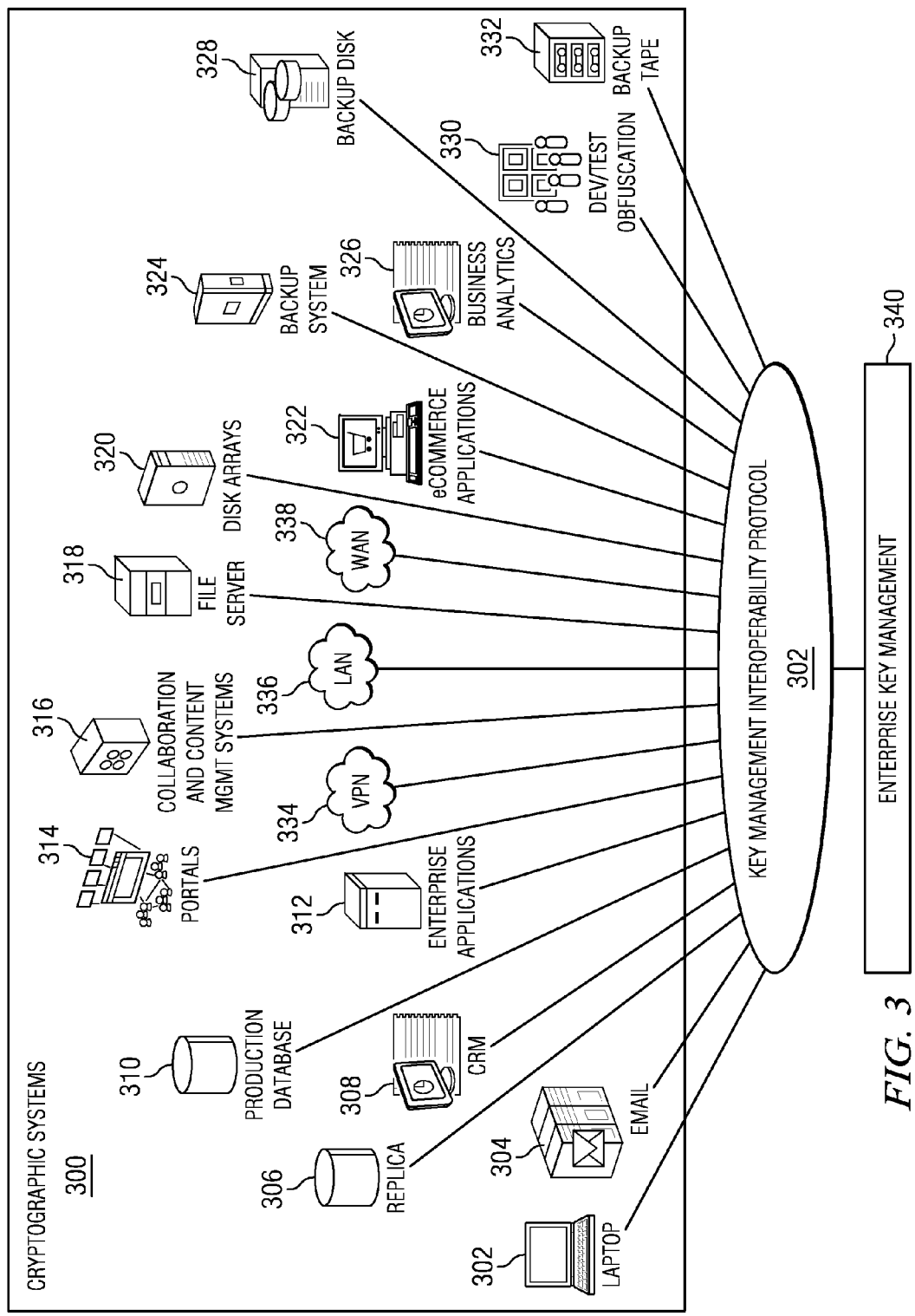
FIG. 3 is a representative enterprise environment in which the Key Management Interoperability Protocol (KMIP) is implemented.

As described above, the Key Management Interoperability Protocol (KMIP) enables key lifecycle management by defining a protocol for encryption client and key management server communication. Key lifecycle operations supported by the protocol include generation, submission, retrieval and deletion of cryptographic keys. Generally, KMIP enables cryptographic clients to communicate via a single protocol to all enterprise key management servers supporting that protocol. FIG. 3 illustrates an operating environment 300 in which the Key Management Interoperability Protocol 302 is implemented to facilitate key lifecycle management in this manner. As seen in FIG. 3, the environment may be quite varied and typically includes various systems, networks, devices, applications and other resources, each of which may rely in some manner upon encryption keys. Representative enterprise elements include, without limitation, staging systems 302, email systems 304, replica storage 306, customer relationship management (CRM) systems 308, production databases 310, enterprise applications 312, portals 314, collaboration and content management systems 316, file servers 318, disk arrays 320, electronic commerce applications 322, backup systems 324, business analytics systems 326, backup disks 328, development/test systems 330, and backup tape systems 332. Data is communicated among the systems and devices over VPN 334, LAN 336, WAN 338, and other networks (not shown).

To facilitate key management, an illustrative, but non-limiting enterprise embodiment implements a key management solution 340, such as IBM® Tivoli® Key Lifecycle Manager, which in a known commercial product that executes in an application server/database server operating environment, such as on IBM WebSphere® Application Server, and DB2®. The application server typically runs a Java virtual machine, providing a runtime environment for application code. The application server may also provide other services, such as communication security, logging, and Web services. The database server provides a relational database.

The key management solution 340 may be implemented within the network shown in FIG. 1 using one or more machines configured as shown in FIG. 2. An enterprise key management solution of this type enables KMIP communication with clients (such as one or more the systems illustrated) for key management operations on cryptographic material. The material includes, without limitation, symmetric and asymmetric keys, certificates, and templates used to create and control their use. The key management server 340 listens for connection requests from KMIP clients that send requests to locate, store, and manage cryptographic material on the server. Using the server 340, the enterprise manages the lifecycle of the keys and certificates. Thus, for example, among other functions, the server enables basic key serving, such as definition and serving of keys, definition of keys or groups of keys that can be associated with a device, and the like, as well as auditing functions. In a typical scenario, the server supports KMIP secret data and symmetric key interoperability profiles for KMIP server and client interactions. The server provides KMIP information, such as whether KMIP ports and timeout settings are configured, current KMIP certificate (indicating which certificate is in use for secure server or server/client communication), whether SSL/KMIP or SSL is specified for secure communication, and so forth. The server may also provide updating KMIP attributes for keys and certificates. The server 340 serves keys at the time of use to allow for centralized storage of key material in a secure location. It also includes a graphical user interface (or, in the alternative, a command line or other programmatic interface) by which administrators (or other permitted entities) centrally create, import, distribute, back up, archive and manage the lifecycle of keys and certificates. Using the interface, administrators can group devices into separate domains, defines roles and permissions, and the like. By default, typically, groups of devices only have access to encryption keys defined within their group. These role-based access control features enable separation of duties, mapping of permissions for what actions against which objects, and enforcement of data isolation and security in a multi-tenancy environment. This also enhances security of sensitive key management operations.

In operation, the management server assists encryption-enabled devices in generating, protecting, storing, and maintaining encryption keys that are used to encrypt and decrypt information that is written to and read from devices. The key management server acts as a background process waiting for key generation or key retrieval requests sent to it through a TCP/IP communication path between itself and various devices, such as a tape library, a tape controller, a tape subsystem, a device driver, or a tape drive, a disk controller, a network switch, a smart meter, and others. These are merely representative cryptographic client devices. When a client writes encrypted data, it first requests an encryption key from the key management server.

KMIP standardizes communication between cryptographic clients that need to consume keys and the key management systems that create and manage those keys. It is a low-level protocol that is used to request and deliver keys between any key manager and any cryptographic client. KMIP uses the key lifecycle specified in NIST SP800-57 to define attributes related to key states. Network security mechanisms, such as SSL/TLS and HTTPS, are used to establish authenticated communication between the key management system and the cryptographic client.

Figure 4:
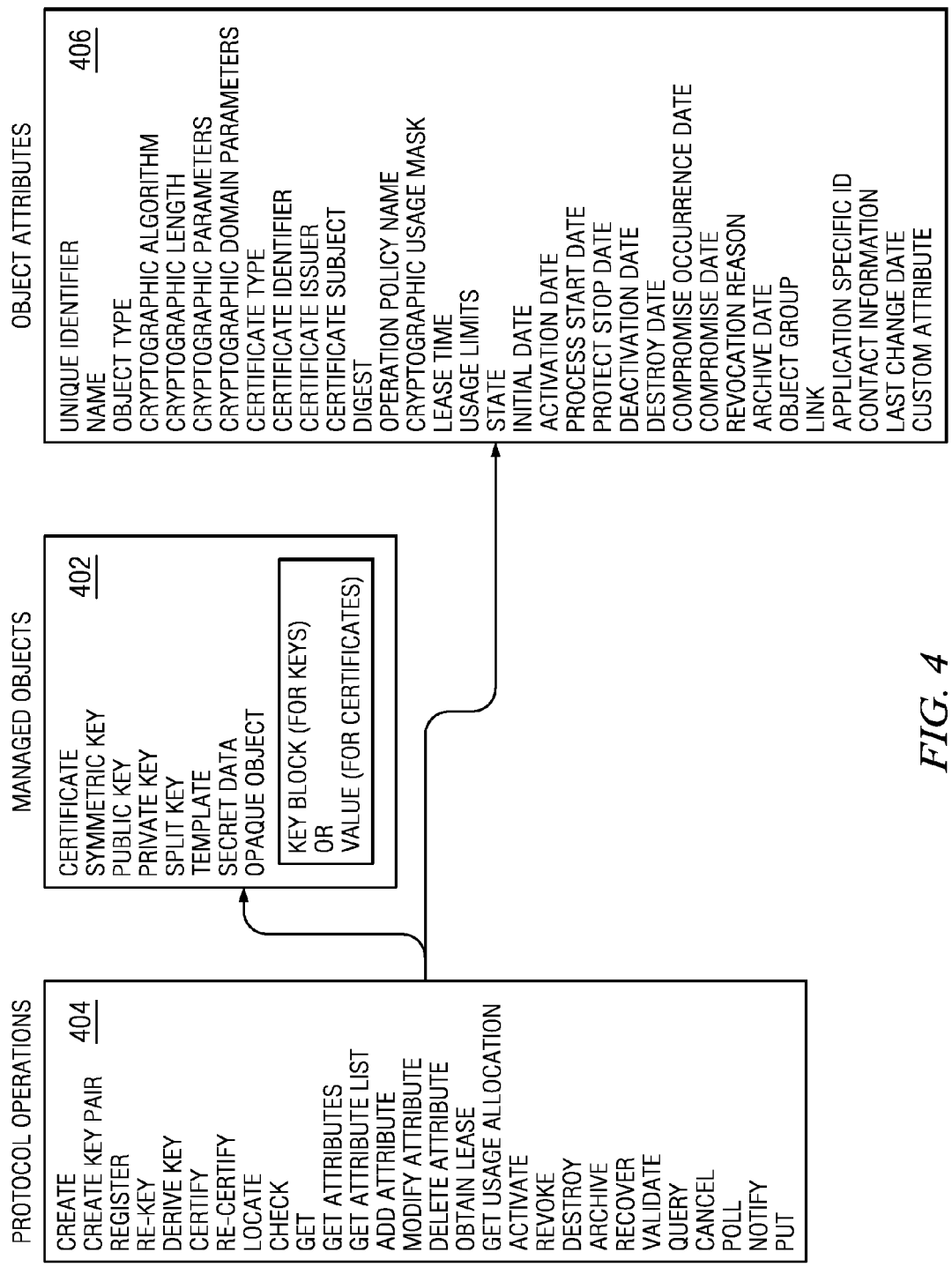
FIG. 4 illustrates the basic elements of the KMIP protocol.

As represented in FIG. 4, KMIP includes three primary elements: objects 402, operations 404, and attributes 406. Objects 402 are the cryptographic material (e.g., symmetric keys, asymmetric keys, digital certificates and so on) upon which operations 404 are performed. Operations 404 are the actions taken with respect to the objects, such as getting an object from a key management system, modifying attributes of an object and so on. Attributes 406 are the properties of the object, such as the kind of object it is, the unique identifier for the object, and so on. These include key length, algorithm, algorithm name, and the like. KMIP also envisions so-called "custom attributes" that can be used for vendor-specific support. Thus, for example, a custom attribute may be a client-side custom attribute, and the KMIP server that receives this value stores and retrieves it as necessary without attempting to interpret it. A custom attribute may also be a vendor-specific server attribute for use by the key management server.

FIG. 5 illustrates the contents and format for a KMIP message. Protocol messages consist of requests and responses, each message 500 including a header 502, and one or more batch items 504 with operation payloads and message extensions.

Figure 6A:
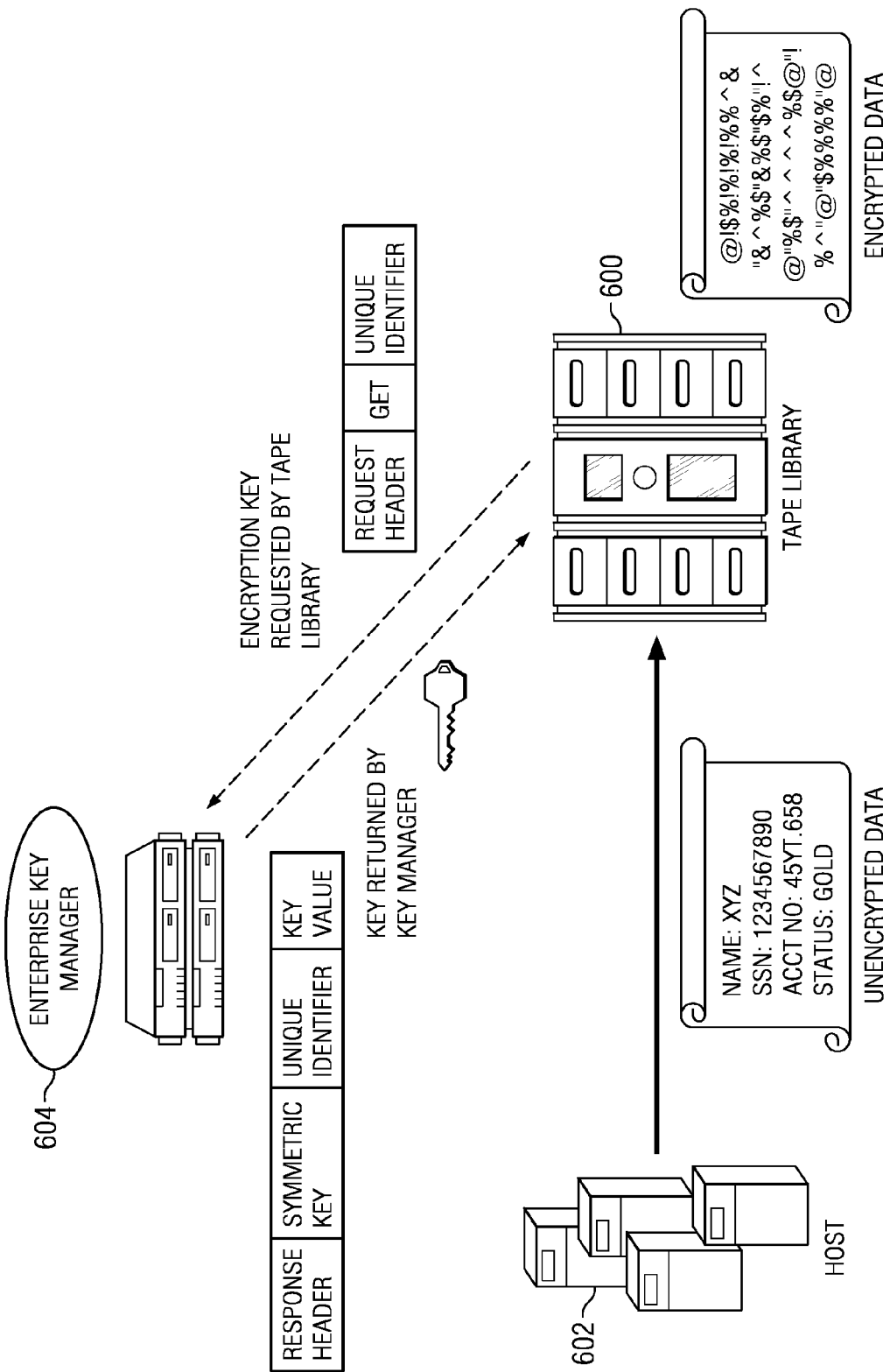
FIG. 6A illustrates a simple KMIP request/response model.
Figure 6B:
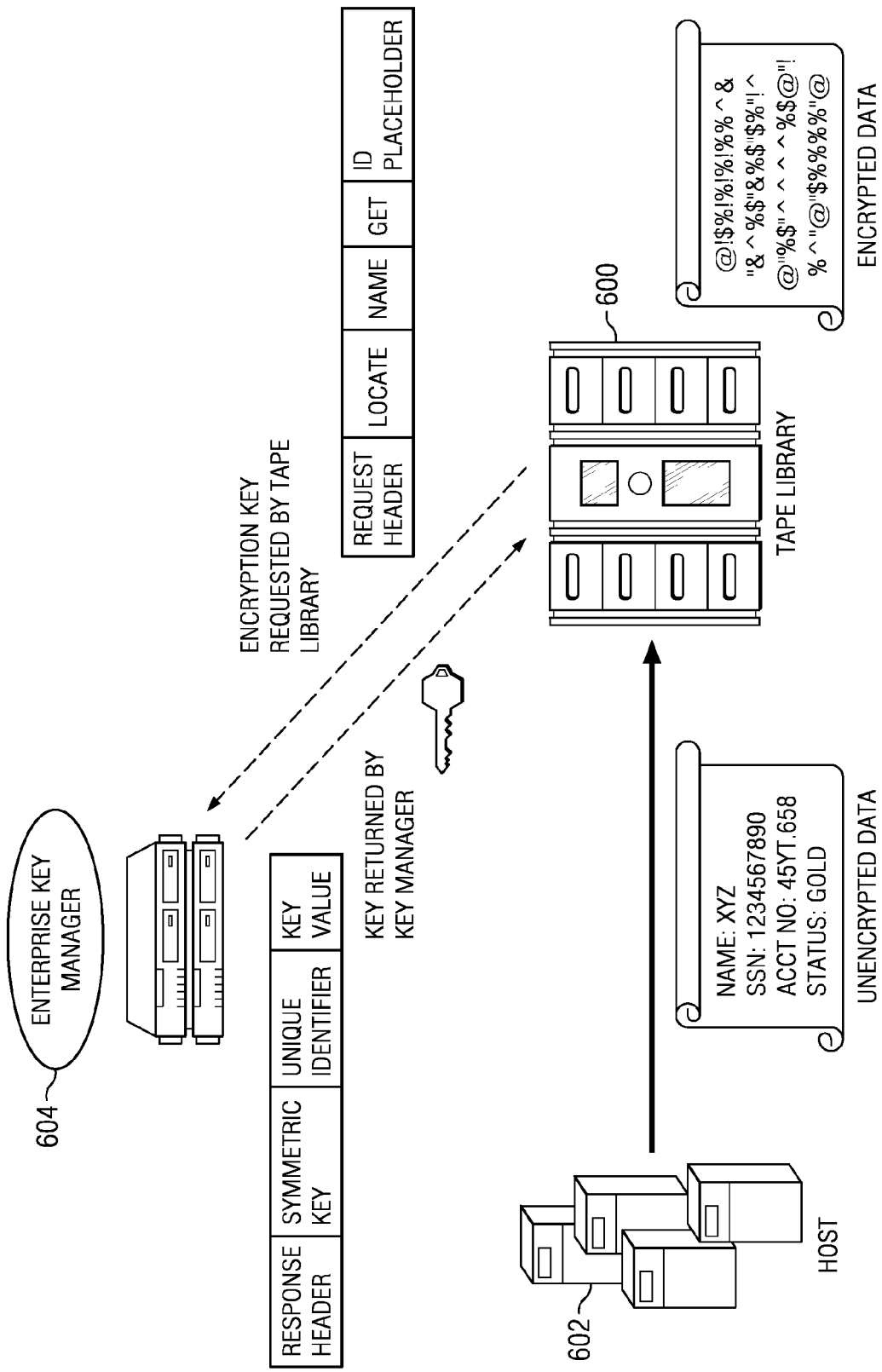
FIG. 6B illustrates the KMIP request/response model of FIG. 6A supporting multiple operations per request.

FIG. 6A illustrates how these elements work within the KMIP context. FIG. 5 also illustrates how KMIP defines a standard message format for exchanging cryptographic objects between enterprise key managers and cryptographic clients. In this example, a tape library 600 with encrypting tape drives has received information from a host system 602 in plaintext form. That information is to be encrypted when written to tape. The tape system 600 sends a request to a key management system 604 for a "Get" operation, passing a unique identifier for a cryptographic object, e.g., a symmetric encryption key, for the encrypting operation. The key management system 604 returns attributes for that object, including not only the value for that key, but also other attributes, such as the kind of key (symmetric) and the unique identifier, that allow the storage system to be sure it is receiving the correct key. Headers for both the request and response provide information, such as the protocol version and message identifiers, that the participating systems can use to track and correlate the messages. FIG. 6B is a similar example showing how the KMIP messages may support multiple operations within a single message. In this example, the tape system 600 requests the key management system 604 to use a "locate" operation to find a key based on a "name" attribute. Once the system 604 has located the key, it then uses the unique identifier attribute for that key, indicated in the request message by the "id placeholder" attribute, to retrieve the key, assemble a response message and return the response to the tape system 600.

As seen in FIG. 4, KMIP objects are varied and include Certificate (a digital certificate), Opaque Object (an object stored by a key management server, but not necessarily interpreted by it), Private Key (the private portion of an asymmetric key pair), Public Key (the public portion of an asymmetric key pair, Secret Data (a shared secret that is not a key or certificate), Split Key (a secret, usually a symmetric key or private key, which is split into a number of parts, which are then distributed to key holders), Symmetric Key (a symmetric key encryption key or message authentication code (MAC) key), and Template (a stored, named list of KMIP attributes).

As the above examples illustrate, in the context of a KMIP-compliant implementation, when a cryptographic client in an encryption environment sends a request to the key management server, it identifies an object and an "operation" on that object. For example, the operation may be a request for a new key or retrieval of an existing key. As seen in FIG. 4, typical operations initiated by a cryptographic client and directed to the key management server include Activate (a request to activate an object), Add Attribute (a request to add a new attribute to an object and set the attribute value), Archive (a request that an object be placed in archive storage), Check (a request to check for the use of an object according to specified attributes), Create (a request to generate a key), Create Key Pair (a request to generate a new public/private key pair), Delete Attribute (a request to delete an attribute for an object), Derive Key (a request to derive a symmetric key), Destroy (a request to destroy key material for an object), Get (a request to return an object, which is specified in the request by a Unique Identifier attribute), Get Attributes (a request for one or more attributes of an object), Get Attributes List (a request of a list of the attribute names associated with the object), Get Usage Allocation (a request of the allocation from a current Usage Limits values for an object), Locate (a request to search for one or more objects, specified by one or more attributes), Modify Attribute (a request to modify the value of an existing attribute), Obtain Lease (a request to obtain a new Lease Time for a specified object), Query (a request to determine capabilities and/or protocol mechanisms), Recover (a request to access an object that has been placed in the archive via the Archive Operation), Register (a request to register an object), Re-key (a request to generate a replacement key for an existing symmetric key), and Revoke (a request to revoke an object). Certificate-specific operations include Certify (a request for a new certificate for a public key or renewal of an existing certificate with a new key), Re-certify (a request to renew an existing certificate with the same key pair), and Validate (a request to validate a certificate chain). Server-initiated operations include Notify (used to notify a client of events) and Put (used to push to clients managed cryptographic objects).

KMIP attributes are sent from the client to the key management server, or are returned from the server to the client. Attributes contain an object's metadata, such as its Unique Identifier, State, and the like (as will be delineated below). Some attributes describe what an object is, some attributes describe how to use the object, and some other attributes describe other features of the object. As the above examples show, attributes can be searched with the Locate operation. As will be described, some attributes are set with specific values at object creation, depending on the object type. Some attributes are implicitly set by certain operations. Other attributes can be explicitly set by clients. Some attributes, once set, cannot be added or later modified or deleted. And, some attributes can have multiple values (or instances) organized by indices.

A core set of attributes are specified for all objects, while object-specific attributes may be specified as needed.

As seen in FIG. 4, the KMIP attributes include the following: Activation Time (the date and time when the object may begin to be used), Application Specific Identification (the intended use of a Managed Object), Archive Date (the date and time when the object was placed in archival storage), Certificate Issuer (an identification of a certificate, containing Issuer Distinguished Name and the Certificate Serial Number), Certificate Subject (the certificate subject, containing the Certificate Distinguished Name), Certificate Type (the type of certificate, such as X.509), Compromise Occurrence Date (the date and time when an object was first believed to be compromised), Compromise Date (the date and time when an object is entered into a compromise state), Contact Information (the name of the entity to contact regarding state changes or other operations for the object), Cryptographic Algorithm (the algorithm used by the object, such as RSA, DSA, DES, etc.), Cryptographic Length (the bit length of the cryptographic key material of the object), Cryptographic Parameters (a set of optional fields that describe certain cryptographic parameters to be used when performing cryptographic operations using the object, such as hashing algorithm), Cryptographic Usage Mask (a bit mask that defines which cryptographic functions may be performed using the key), Custom Attribute (user-defined attribute intended for vendor-specific purposes), Deactivation Date (the date and time when the object may no longer be used for any purpose), Destroy Date (the date and time when the object when the object was destroyed), Digest (a digest of the key (digest of the Key Material), certificate (digest of the Certificate Value), or opaque object (digest of the Opaque Data Value), Initial Date (the date and time when the object was first created or registered), Last Changed Date (the date and time of the last change to the contents or attributes of the specified object), Lease Time (the time interval during a client should use the object), Link (a link from an object to another, closely related object), Name (a descriptor for the object, assigned by the client to identify and locate the object), Object Group (the name of a group to which the object belongs), Object Type (the type of object, such as public key, private key, or symmetric key), Operation Policy Name (an indication of what entities may perform which key management operations on the object), Owner (the name of the entity that is responsible for creating the object), Process Start Date (the date and time when an object may begin to be used for process purposes), Protect Stop Date (the date and time when the object may no longer be used for protect purposes), Revocation Reason (an indication why the object was revoked), State (the state of an object as known to the key management system), Unique identifier (a value generated by the key management system to uniquely identify the object), and Usage Limits (a mechanism for limiting the usage of the object).

A custom attribute whose name starts with a certain value (i.e., "x-") is a client-side custom attribute, and KMIP server stores and retrieves it as necessary, without attempting to interpret it. A custom attribute whose name starts with another certain value (i.e., "y-") is a vendor-specific server attribute for the server's use.

Extended Credential Type to Group KMIP Clients

According to this disclosure, KMIP is extended to provide an extended credential type to pass sufficient information from cryptographic clients to the key management server to enable the server to deduce appropriate pre-provisioned cryptographic materials for the individual clients. The custom credential type (and, in particular, the information passed therein) as described herein enables the client to pass sufficient information to the key management server so that the server can determine the type of device that is requesting resources and thus return materials appropriate for that type of device. A preferred embodiment is to pass the credential information as one or more values in a header of the KMIP request that flows from the client to the server, although an alternative (although less optimal) approach is to pass the information in a message extension area particular to each request in a batch of requests.

Figures 7, 9:
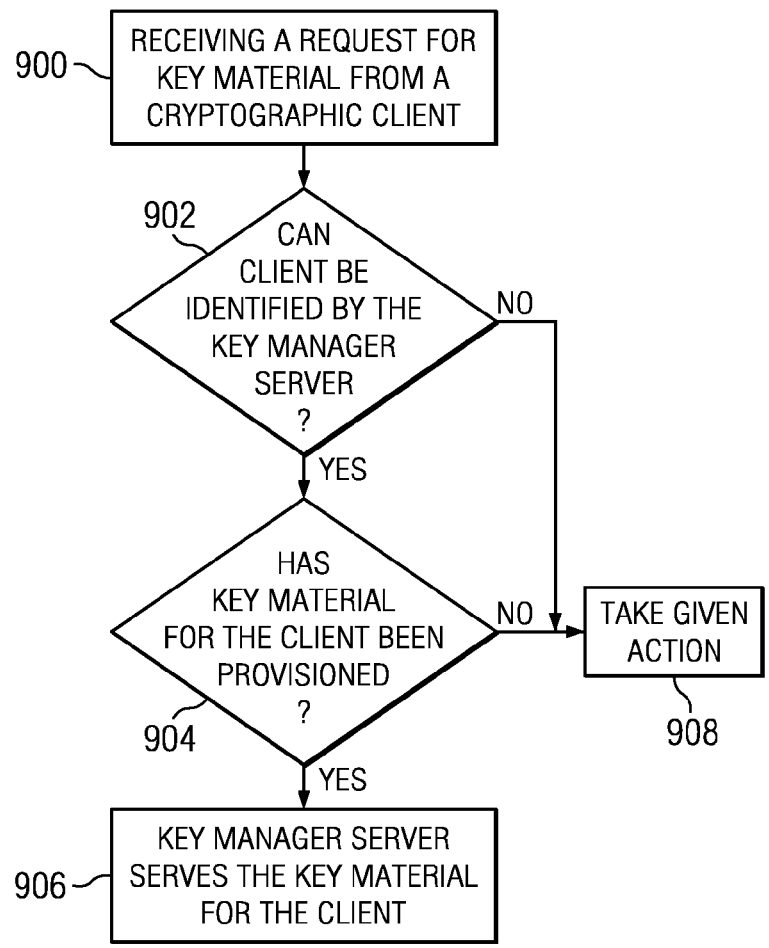
FIG. 7 illustrates an extended credential type according to this disclosure.
FIG. 9 is a key management server side process flow illustrating how the KMIP request is processed by the key management server in a representative embodiment.

As noted above, the extended credential leverages the existing KMIP custom attribute. FIG. 7 illustrates an extended credential type 700. The credential type preferably comprises a set of fields, some of which are required, and others that are optional. These fields are now described with reference to FIG. 7. The data structure follows the Tag-Type-Length-Value encoding scheme that KMIP uses to transfer data. It includes a set of extended tag values that are shown in FIG. 7. These values include a required "device serial number," which is used as the identifier of the device in the key management server and must be unique within a given server. Preferably, this value can be up to 48 characters, and it may contain alphanumeric, period, space, dash, semicolon, and underscore characters with no leading or trailing spaces. This field must always be filled in. The "device group" field identifies the device groups that will be associated with this device when it is added, and it is a required field if the device is attempting dynamic registration with the server (if the device's group is already known to the server, this field is optional). This field should only contain printable characters with no asterisks and leading or trailing blanks. It may be up to 16 characters long and is NULL terminated. The "device text" field includes text to be associated with the device when the device is registered with the key management server. This field is only used when the device is registered. Any other time, this field is not used by the key management server; thus, the field is optional. This field should only contain printable characters with no asterisks and leading or trailing blanks. This value must also be unique within the key management server. The "machine identifier" field is an identifier of the machine (machine ID) and may be up to 48 characters long and is NULL terminated. It may contain any printable characters, but no asterisks. If this field is present in the data structure, the "worldwide name" and "media identifier" (described below) are not used. The "media identifier" field includes a media identifier (media ID), and it may be up to 12 characters long, and is NULL terminated. It should contain only a hex string and must only contain characters 0-9 and A-F. The "worldwide name" must be up to 8 characters long, and it is expected to be byte data and not printable. The "machine text" field includes text to be associated with the machine ID, when the device is registered with the key management server. This field is only used when the device is registered. Any other time, this field is not used by the server; thus, it is also optional. This field should only contain printable characters with no asterisks and leading or trailing blanks. This value must be unique within the particular key management server. In the above description, each extended tag value is identified by a character name ("char"), which is a single 8 bit value, although all strings in the extended credential are UTF-*8 strings.

The above-identified fields and their field values (required and/or optional) comprise a data structure or, more generally, a set of data comprising the extended credential. Preferably, and as has been described, the credential object is wrapped inside an octet stream envelope that conforms to the KMIP Tag-Type-Length-Value (TTLV) encoding scheme.

Figure 8:
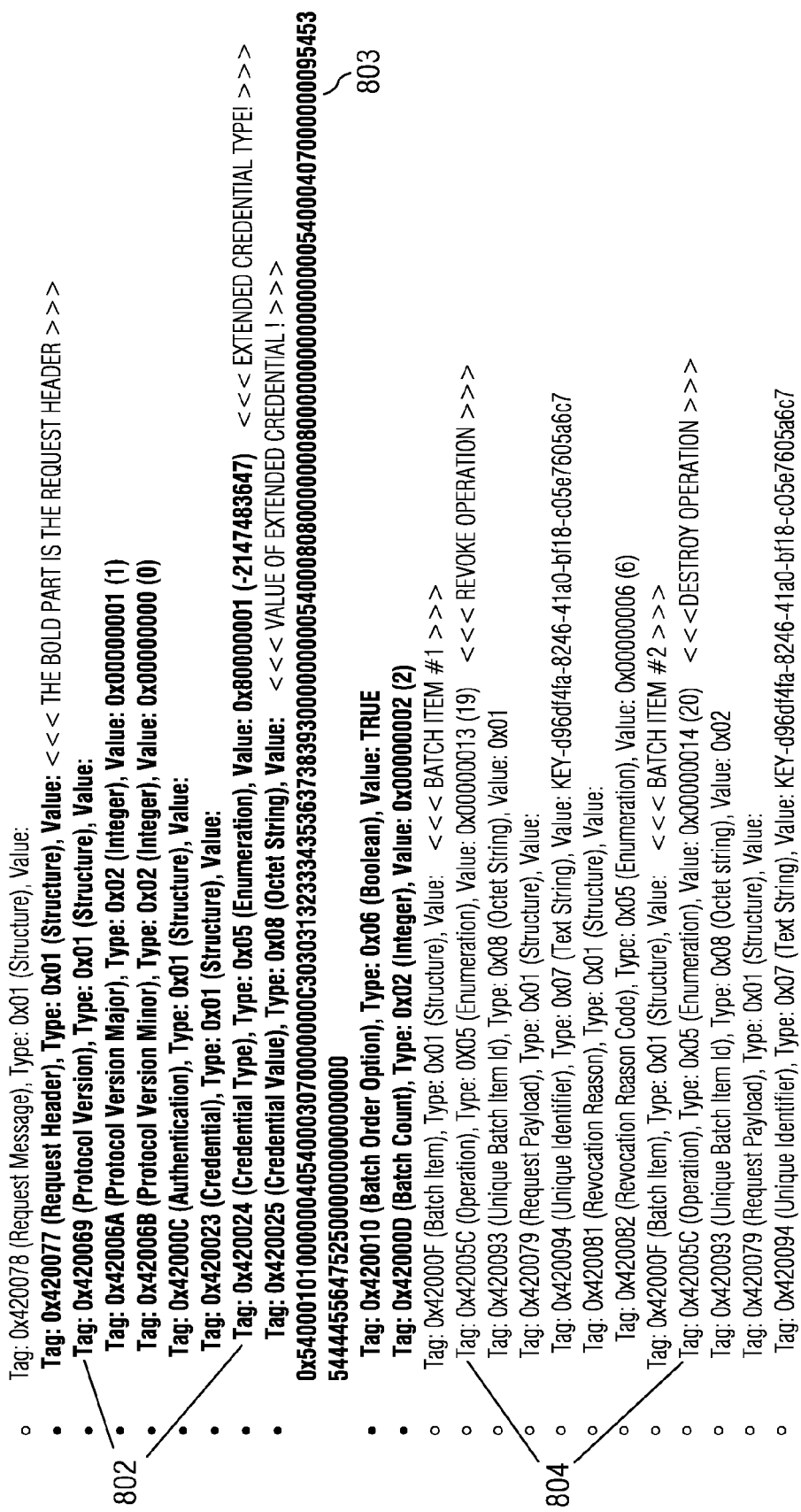
FIG. 8 illustrates an example KMIP request that includes the extended credential according to this disclosure.

FIG. 8 illustrates an example KMIP request 800 that includes the extended credential according to this disclosure. In this example, and as can be seen, the request header 802 includes a set of values including the Credential, Credential Type (in this case representing the extended credential type as described), and the Credential Value itself. The Credential Value 803 is a concatenated string corresponding to the values of the individual fields that have been described above, and these values include the device identifier, and the device group. In this example, which is merely representative, the body 804 of the KMIP request 800 includes two (2) consecutive operations (a revoke operation, and then a destroy operation) that are carried out under the authorization of the credentials provided. Based on the credential value (and the information encoded therein, as has been described), the key management server associates this particular batch of requests with a particular device type. This enables the key management server to connect the KMIP request to appropriate pre-provisioned cryptographic materials for particular devices or device groups. The KMIP server may make additional validity checks to ensure the authenticity of this batch of requests, but such checks are outside the scope of this disclosure.

FIG. 9 is a process flow illustrating how the KMIP request is processed by the key management server in a representative embodiment. This method is used to process device type information in a client-side certificate authentication process. It begins at step 900 upon the key management server receiving a client request for key material. The key material typically identifies a device type. Preferably, a plurality of devices having a same device type typically share a pool of the key material. Typically, the client request includes a client-side certificate and a custom credential distinct from the certificate. The client-side certificate is used to authenticate the client, and the custom credential is used to identify the client and to determine whether key material for the client has been provisioned. At step 902, a test is performed to determine if the client can be identified. If so, a test is performed at step 904 to determine if the key material for the client has been provisioned. If the result of the test at 904 is positive (namely, that the client has been identified and the key material for the client has been provisioned), routine continues at step 906 with the key material being served by the key management server. If, however, the custom credential fails to identify the client (the outcome of step 902 is negative), or if the key material has not been provisioned (the outcome of the step 904 is negative), a given action is taken. This is step 908. The given action may be refusing the client request, placing the client request in a queue for administrator review, or the like.

The subject matter described herein has many advantages. The technique is advantageous as it leverages a KMIP extension point (in the KMIP Version 1 protocol) without burdening a KMIP client with unmanageable PKI maintenance costs. The technique is simple to implement, as it uses the existing "credential" feature of KMIP. The technique enables the key management server to know more about the identity of its clients so as to be able to group them into device types and device groups. The described technique enables a cryptographic client easy access to pre-provisioned cryptographic materials. Another advantage is that the technique provides clients a simple way in which they can contribute materials of their own to the pool of materials for their device type/group.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein and the key management server may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the extended credential functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the KMIP extended credential and its components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises client-side code to generate the above-described encoding.

The extended KMIP credential and its processing may be implemented as an adjunct or extension to an existing key lifecycle manager or other policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like. As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

Having described the invention, what is now claimed is as follows:

1. A method operative in association with a key management server for processing device type information in a certificate authentication process, comprising:
  receiving a client request for key material, the client request including a client-side certificate, and a custom credential distinct from the client-side certificate and that encodes, as a data string, data identifying a device identifier unique within the key management server, and a device type;
  using the client-side certificate to authenticate the client;

using the device identifier in the custom credential to attempt to identify the client, and using the device type to determine whether key material for the client has been provisioned; and serving the key material to the client when, based on the custom credential, the client has been identified by the device identifier and the key material for the client has been provisioned;

wherein at least of the receiving, using and serving steps is carried out in software executing in a hardware element.

2. The method as described in claim 1 further including associating the client request to pre-provisioned cryptographic material for one of: a particular device identified by the device identifier, and a device group.

3. The method as described in claim 1 wherein the key material identifies the device type.

4. The method as described in claim 3 wherein a plurality of devices having a same device type share a pool of key material.

5. The method as described in claim 1 further including taking a given action if the custom credential fails to identify the key or the key material has not been provisioned.

6. The method as described in claim 5 wherein the given action is one of: refusing the client request, and placing the client request in a queue.

7. The method as described in claim 1 wherein the client request is associated with a key management protocol and the custom credential is passed in a header file of the key management protocol.

8. The method as described in claim 7 wherein the key management protocol is the Key Management Interoperability Protocol (KMIP).

9. The method as described in claim 1 wherein the data string comprises the device identifier concatenated with the device type, encoded as an octet stream.

10. Apparatus associated with a key management server, comprising:
a processor;
computer memory holding computer program instructions that when executed by the processor perform a method comprising:
receiving a client request for key material, the client request including a client-side certificate, and a custom credential distinct from the client-side certificate and that encodes, as a data string, data identifying a device identifier unique within the key management server, and a device type;
using the client-side certificate to authenticate the client;
using the device identifier in the custom credential to attempt to identify the client, and using the device type to determine whether key material for the client has been provisioned; and
serving the key material to the client when, based on the custom credential, the client has been identified by the device identifier and the key material for the client has been provisioned.

11. The apparatus as described in claim 10 wherein the method further includes associating the client request to pre-provisioned cryptographic material for one of: a particular device identified by the device identifier, and a device group.

12. The apparatus as described in claim 10 wherein the key material identifies the device type.

13. The apparatus as described in claim 12 wherein a plurality of devices having a same device type share a pool of key material.

14. The apparatus as described in claim 10 wherein the method further includes taking a given action if the custom credential fails to identify the key or the key material has not been provisioned.

15. The apparatus as described in claim 14 wherein the given action is one of: refusing the client request, and placing the client request in a queue.

16. The apparatus as described in claim 10 wherein the client request is associated with a key management protocol and the custom credential is passed in a header file of the key management protocol.

17. The apparatus as described in claim 16 wherein the key management protocol is the Key Management Interoperability Protocol (KMIP).

18. The computer program product as described in claim 16 wherein the key management protocol is the Key Management Interoperability Protocol (KMIP).

19. A computer program product in a non-transitory computer readable medium for use in a data processing system associated with a key management server, the computer program product holding computer program instructions which, when executed by the data processing system, perform a method comprising:
receiving a client request for key material, the client request including a client-side certificate, and a custom credential distinct from the client-side certificate and that encodes, as a data string, data identifying a device identifier unique within the key management server, and a device type;
using the client-side certificate to authenticate the client;
using the device identifier in the custom credential to attempt to identify the client, and using the device type to determine whether key material for the client has been provisioned; and
serving the key material to the client when, based on the custom credential, the client has been identified by the device identifier and the key material for the client has been provisioned.

20. The computer program product as described in claim 19 wherein the method further includes associating the client request to pre-provisioned cryptographic material for one of: a particular device identified by the device identifier, and a device group.

21. The computer program product as described in claim 19 wherein the key material identifies the device type.

22. The computer program product as described in claim 21 wherein a plurality of devices having a same device type share a pool of key material.

23. The computer program product as described in claim 19 wherein the method further includes taking a given action if the custom credential fails to identify the key or the key material has not been provisioned.

24. The computer program product as described in claim 23 wherein the given action is one of: refusing the client request, and placing the client request in a queue.

25. The computer program product as described in claim 19 wherein the client request is associated with a key management protocol and the custom credential is passed in a header file of the key management protocol.

* * * * *